United States Patent
Chang (10) Patent No.: US 9,402,477 B2
(45) Date of Patent: Aug. 2, 2016

(54) SUPPLEMENTARY ORGANIZER AND STORAGE DEVICE

(71) Applicant: Melissa Shih Hwai Chang, Salt Lake, UT (US)

(72) Inventor: Melissa Shih Hwai Chang, Salt Lake, UT (US)

(*) Notice: Subject to any disclaimer, the term of this patent is extended or adjusted under 35 U.S.C. 154(b) by 0 days.

(21) Appl. No.: 13/998,792

(22) Filed: Dec. 5, 2013

(65) Prior Publication Data

US 2014/0166602 A1 Jun. 19, 2014

Related U.S. Application Data (60) Provisional application No. 61/797,774, filed on Dec. 17, 2012.

(51) Int. Cl.
*A47B 97/00* (2006.01)

(52) U.S. Cl.
CPC ..................................... *A47B 97/00* (2013.01)

(58) Field of Classification Search
CPC ............ A47B 97/00; B62J 9/00; B62J 9/008; E01F 9/03; B42F 7/04; B42F 7/06; B65D 25/20; B65D 25/22; A45C 2003/005
USPC ........................................ 211/86.01; 206/373
See application file for complete search history.

(56) References Cited

U.S. PATENT DOCUMENTS

| | | | |
|---|---|---|---|
| 2,979,098 A * | 4/1961 | Greaves | 224/275 |
| D254,343 S | 3/1980 | Babcock | |
| 4,241,857 A | 12/1980 | Perethian et al. | |
| 4,402,439 A | 9/1983 | Brown | |
| 4,433,802 A | 2/1984 | Woolf | |
| 4,442,960 A | 4/1984 | Vetter | |
| 4,821,853 A * | 4/1989 | Young | 190/111 |
| 5,031,807 A * | 7/1991 | Tiffany | 224/429 |
| 5,100,000 A | 3/1992 | Huseman | |
| 5,377,570 A | 1/1995 | Giljam | |
| D408,137 S | 4/1999 | Leininger | |
| 5,890,639 A | 4/1999 | Hancock et al. | |
| 6,029,875 A | 2/2000 | Johnston | |
| D445,398 S | 7/2001 | Hanagan | |
| 6,398,023 B1 * | 6/2002 | Williams | G11B 33/0472 206/308.1 |
| D479,185 S | 9/2003 | Hanagan | |
| D497,341 S | 10/2004 | Hanagan | |
| 6,830,169 B1 | 12/2004 | Campbell | |
| 7,207,470 B2 | 4/2007 | Akita et al. | |
| D550,146 S | 9/2007 | Hanagan | |
| D585,358 S | 1/2009 | Hanagan et al. | |
| D585,359 S | 1/2009 | Hanagan et al. | |
| D585,360 S | 1/2009 | Hanagan et al. | |
| D600,190 S | 9/2009 | Sharpe, Jr. | |
| 7,938,302 B2 | 5/2011 | Gibson | |
| 8,162,091 B2 | 4/2012 | Laperle et al. | |
| 2002/0092785 A1* | 7/2002 | Lungo | 206/373 |
| 2005/0029272 A1* | 2/2005 | Padilla | A45C 13/00 220/735 |
| 2005/0184118 A1* | 8/2005 | Vella | 224/625 |
| 2006/0000790 A1* | 1/2006 | Smiddy et al. | 211/86.01 |

* cited by examiner

*Primary Examiner* — Joshua Rodden (74) *Attorney, Agent, or Firm* — Paul M. Denk (57) ABSTRACT

A supplementary organizer and storage device is disclosed in which the device comprises a central portion having a first side and a second side both descending down from the central portion, the first side having a pocket for receiving an object and the second side having a pocket for receiving an object, the central portion for being placed on top of an appliance and the first side and the second side for draping over top of the appliance.

12 Claims, 7 Drawing Sheets

SUPPLEMENTARY ORGANIZER AND STORAGE DEVICE

CROSS REFERENCE TO RELATED APPLICATION

This non-provisional patent application claims priority to the provisional patent application having Ser. No. 61/797,774, filed on Dec. 17, 2012.

FIELD OF THE DISCLOSURE

This disclosure relates to an organizer, which may be used in conjunction with an item of furniture or appliance, such as a mini refrigerator, to provide for supplemental storage of items through its arranged pockets and pouches.

BACKGROUND

Saddlebag inspired organizational products have existed for years, and have been reinterpreted in a wide variety of materials and configurations for different types of industries and applications. Some areas that have been addressed include saddlebags for motorcycles, bicycles, cars, sinks, chairs/sofas, sawhorses, and rolling carts. However, there are still significant needs and opportunities in improving and applying a saddlebag style organizer concept within areas of industry, such as, in case of this current disclosure, to drape it over an appliance, such as a refrigerator, and other furnishings in the home and workplace.

Saddlebags have been around for sometime, generally used in conjunction with equestrian pursuits, and obviously were used for storing personal items, for the horseback rider. Obviously, other storage devices have long been available in the art, such as backpacks, hip pouches, fanny packs, and related types of devices for storing personal needs. Examples of these types of items can be seen in the following United States patents.

Various prior patents that show saddlebag type of structures can be seen in the U.S. Pat. No. 4,402,439, to Brown, showing a saddlebag structure for use with a bicycle.

The patent to Babcock, U.S. Pat. No. Des. 254,343, shows aesthetically formed saddlebags.

The patent to Giljam, U.S. Pat. No. 5,377,570, shows an Apparatus for Perforating Plastic Film Saddle Bags.

U.S. Pat. No. 8,162,091, shows a System for Mounting a Box or Bag to a Vehicle.

U.S. Pat. No. 7,938,302, shows a Wing Pocket Article Carrier.

U.S. Pat. No. 7,207,470, shows the Structure of Mounting Saddle Bag in Two-Wheeled Motor Vehicle.

U.S. Pat. No. 6,830,169, shows a Quick Release Saddlebag Mounting System.

U.S. Pat. No. 6,029,875, shows a Bicycle Mounted Knapsack.

U.S. Pat. No. 5,890,639, shows a Multi-Purpose Bag System.

U.S. Pat. No. 5,100,000, shows a Suspendable Bag and Support Structure.

U.S. Pat. No. 4,433,802, shows a Combination Back Pack and Bicycle Saddle Pack.

U.S. Pat. No. 4,241,857, shows a Saddle Bag.

U.S. Design Patents having numbers Nos. Des. 600,190, Des. 585,360, Des. 585,359, Des. 585,358, Des. 550,146, Des. 497,341, Des. 479,185, and Des. 445,398, show a pair of motorcycle saddlebags.

U.S. Pat. No. Des. 408,137, shows Shoulder Saddlebags.

U.S. Pat. No. 4,442,960, also shows Saddlebags.

These are all examples of various styles of saddlebags that have previously been patented.

The present disclosure is designed to obviate and overcome many of the disadvantages and shortcomings experienced with prior saddlebags. The present disclosure is related to a supplementary organizer and storage device that may be used with an appliance or a piece of furniture to provide additional storage options.

SUMMARY OF THE DISCLOSURE

This disclosure contemplates the use of a specially designed storage device, that incorporates one or more pouches, and which can operate in conjunction with other items of furniture, or even appliances, in order to supplement storage of miscellaneous items by the homeowner, in a dormitory, or even at a business. Essentially, the object of this device is to organize and maximize underutilized spaces around refrigerators, nightstands, side tables, desks, bunk beds, and shelving units, amongst other items of furniture. In doing so, the configuration of the storage pockets of this particular device straddle, for example, in the preferred embodiment, the top of a refrigerator, and extend their saddlebags or pouches down the sides of the appliance, allowing items to be organized and stored in its integral pouches, to add to the storage facilities of the area.

The device of the present disclosure is used to provide an economical, easy to use, and space saving solution for a small living area and workspaces, such as, for example, as previously described, for use in a dormitory room by the student to add to their storage capabilities. There is a need for storage and organizational products for items that can be used in conjunction with a refrigerator, as an example, and especially the compact/mini fridges.

Based upon current research, there is currently no such commercially available saddlebag style of organizer concept for use with a refrigerator, or other furnishings, such as the nightstand, shelves, bunk beds, and desks, in the marketplace. As a result, an opportunity through the use of the current device has been noted through the development of this type of a saddlebag organizer, for such personal or related items, and when this storage device is used in conjunction with a refrigerator, it can be used to hold kitchen items and other personal accessories, as can be understood.

This organizer was developed as an opportunity for offering an economical, easy to use, and space saving organizational solution for the sides and tops of a refrigerator, and similar sized furnishings. The types of organizers that are currently available usually are much more bulky and take up too much space when not in use. Generally they are primarily made of heavier and inflexible materials, such as metal, plastic, and wood. Such organizers are also not portable and cannot easily be moved and transported. The device of the present disclosure is much more efficient and effective, by providing a saddlebag style of storage means that may be used, as explained, draped over a mini fridge, as can be understood. In situations where the current invention needs to be stored or moved to another location, its portability and ability to be easily packed are considered key benefits.

This type of organizer will come in a variety of configurations and materials in order to accommodate the organizational needs of differently sized refrigerators and furnishings and to address a variety of price points as required by a diverse marketplace. Generally speaking, the organizers will be made of a durable easy to clean and maintain fabric/material. In the area where the organizer may sit on the top of a refrigerator, or piece of furniture, there will be, potentially, a nonslip backing as well as a more structured material added to improve the strength, stability, durability, for holding the organizer in place, as upon the refrigerator. And, the nonslipping aspect of the backing will have some frictional characteristics to keep the storage device in place. In addition to the nonslip aspect of the top, there may be cases in which an adjustable feature may be incorporated to allow the users to re-size the organizer to fit differently sized refrigerators or furnishings. In other words, the adjustable feature would enable users to either extend or shorten the length of the side panels or widen and decrease the width of the top panel. Storage pockets will come in a variety of sizes and positions, in addition to colors, to accommodate the range of objects, utensils, tools, and accessories, with which the device is to be used. Some pockets will have gussets, elasticized edges, zippers, and/or flaps, in order to add to their versatility and expansion for usage. Moreover, some of these pockets or compartments may be hidden out of plain view, such as on the underside of the embodiment, with secure zippers so the user can store away certain valuables. In some versions, there may be some hooks or loops added to increase the functionality of the storage device. In addition, small magnets may be added to the underside of the organizer along the edges and/or corners so as to secure it in place more efficiently and effectively against the refrigerator, when used as a storage device in that manner. Padding may also be added in the inner lining of the side panels to further protect the fridge or piece of furniture as well the items contained in the storage pockets. In addition, when not in usage, the organizer will be easy to fold, transport, and put into storage.

In one form of the present disclosure, a supplementary organizer and storage device is disclosed in which the device comprises a central portion having a first side and a second side both descending down from the central portion, the first side having at least one pocket for receiving an object and the second side having at least one pocket for receiving an object, the central portion for being placed on top of an appliance or item of furniture with the first side and the second side for draping over top and depending downwardly therefrom.

In light of the foregoing comments, it will be recognized that the present disclosure provides a supplementary organizer and storage device which is of simple construction and design, is inexpensive, and which can be easily employed with highly reliable results.

The present disclosure provides a supplementary organizer and storage device that is adjustable to be able to fit on various sized and shaped appliances.

The present disclosure provides a supplementary organizer and storage device that is relatively lightweight so that it may be easily used, positioned, stored, transported, and adjusted.

The present disclosure provides a supplementary organizer and storage device that may hold or store various sized and shaped objects.

These and other advantages of the present disclosure will become apparent to those skilled in the art after considering the following detailed specification in conjunction with the accompanying drawings.

DETAILED DESCRIPTION OF PREFERRED EMBODIMENTS

Figures 1, 2, 3, 4:
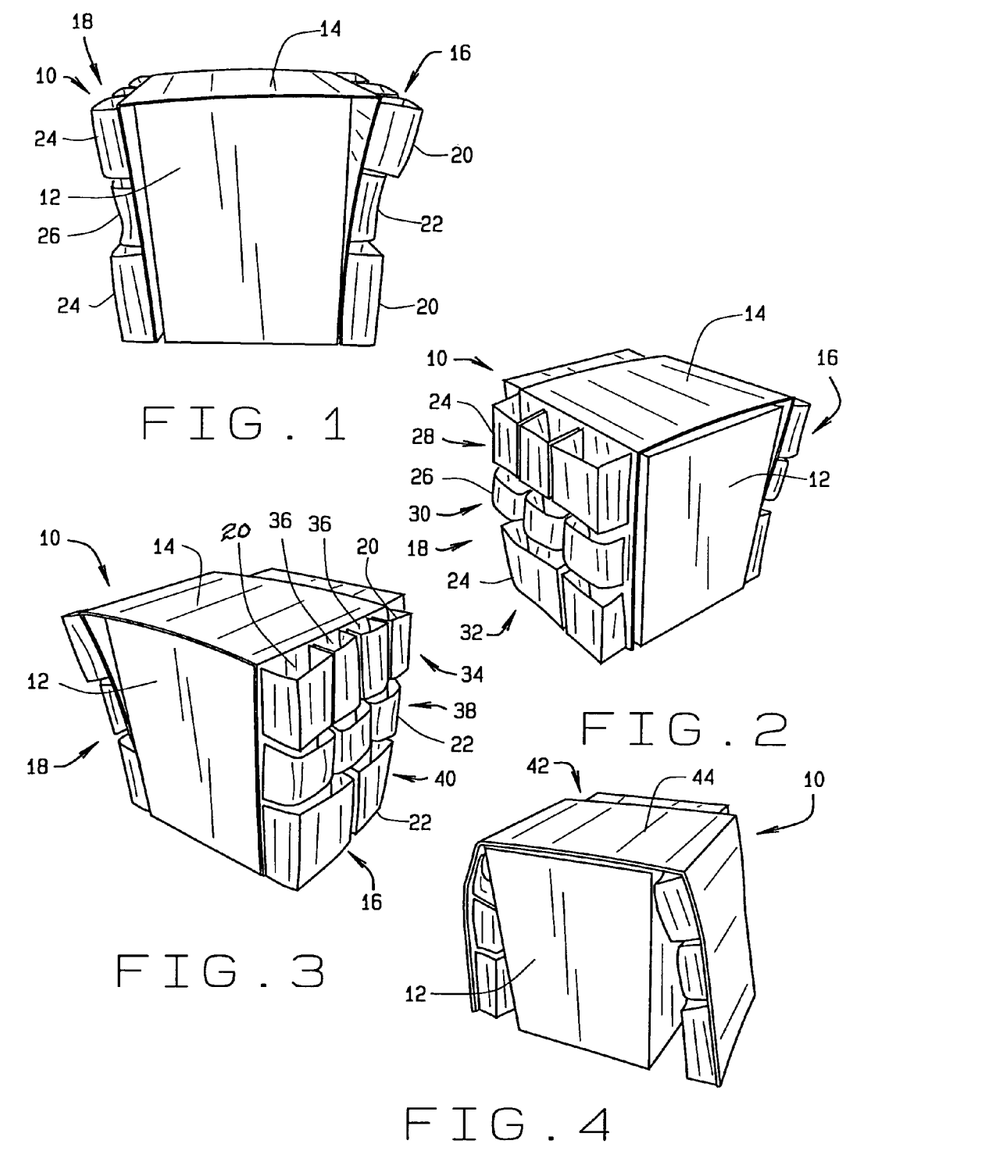
FIG. 1 is a side view of a supplementary organizer and storage device constructed according to a previous disclosure as applied to and draped over a mini refrigerator.
FIG. 2 is a side perspective view of one side of the supplementary organizer and storage device shown in FIG. 1.
FIG. 3 is an opposite side perspective view of the supplementary organizer and storage device shown in FIG. 1.
FIG. 4 is a view of the storage device inverted, so as to show reinforcement upon an upper interior surface, such as coating of rubber, or other frictional material, to hold the storage device in place once it is assembled and positioned in the manner as shown in FIG. 1. Moreover, this view is to show the interior surface of the side panels, which hold a padded inner lining for additional protection of surfaces and stored objects.

Referring now to the drawings, wherein like numbers refer to like items, number 10 identifies another embodiment of a supplementary organizer and storage device constructed according to the present disclosure. With reference now to FIG. 1, the supplementary organizer and storage device 10 is shown being installed over a refrigerator 12, such as a mini refrigerator, which may be found in a college dormitory room. The storage device 10 comprises a central portion 14 having a first side 16 and a second side 18. The first side 16 and the second side 18 may be placed in a reverse orientation over the refrigerator 12, if desired. The first side 16 has a number of pockets or pouches 20 for receiving items such as objects, utensils, tools, or accessories. The first side 16 also has a number of elastic mesh storage compartments 22. The second side 18 also has a number of pockets or pouches 24 and a number of elastic mesh storage compartments 26. All of the pockets 20 and 24 and the compartments 22 and 26 may be expandable by use of gussets or elastic.

FIG. 2 illustrates a side perspective view of the second side 18. The second side 18 has a first row 28 of the pockets 24. In this particular embodiment there are three equally sized pockets 24 in the first row 28. A second row 30 has the elastic mesh storage compartments 26. The compartments 26 are all of the same size. A third row 32 has the pockets 24 with one of the pockets 24 being larger than the other pocket 24. In this manner, larger items may be stored in the larger pocket 24.

Referring now to FIG. 3, a side perspective view of the first side 16 is shown. The first side 16 has a first row 34 of the pockets 20. The first row 34 may have four equally sized pockets 20. Intermediate the intersection of each of the pockets 20 may be formed of circular compartments 36 that are shaped to hold cylindrical items such as soda or water bottles or beer cans so the pockets 20 can function to hold round objects. A second row 38 has three elastic mesh storage compartments 22. The first side 16 also has a third row 40 of two equally sized and shaped pockets 20. The first side 16 has more smaller sized pockets 20 in the first row 34 than the second side 18 has in the first row 28 of the second side 18. Due to this difference, the first side 16 may be able to store smaller sized items in the pockets 20 in the first row 34. Also, the pockets 36 may allow the first side 16 to store bottles and cans.

FIG. 4 depicts the supplementary organizer and storage device 10 being inverted to show an interior side 42 of the central portion 14. The interior side 42 may consist of a sturdy fabric or a frictional rubberized material 44 so that when the interior side 42 rests on the refrigerator 12 it will not move and will remain in place. This may be necessary when the first side 16 may have more items stored therein than the second side 18 causing an unbalanced condition. Without the interior side 42 having the material 44, the storage device 10 may slip off of the refrigerator 12 or the storage device 10 may be shifted presenting an unsightly look. This view also shows the interior surface of the side panels, which hold a padded inner lining for additional protection of surfaces that the storage item is placed on and the stored objects the item holds.

Figures 5, 6, 7, 8:
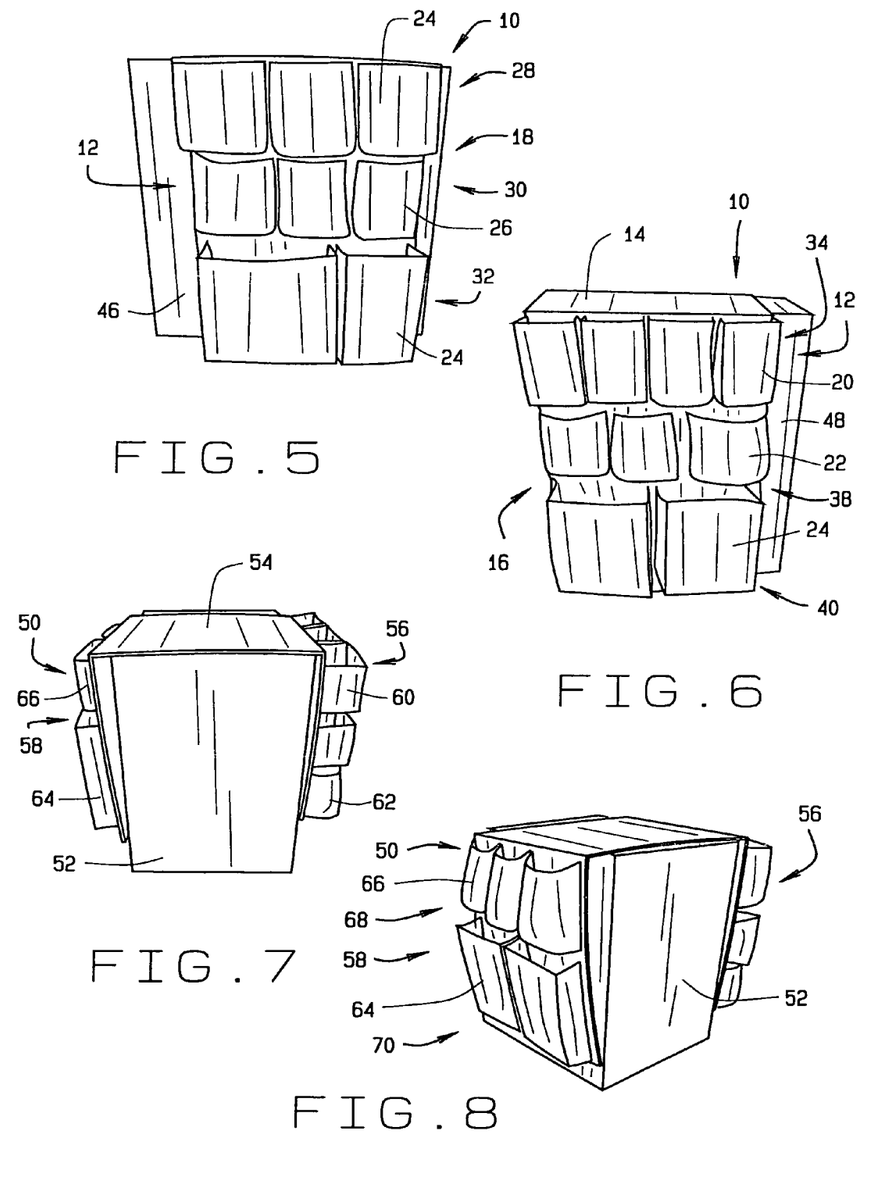
FIG. 5 is a side view of the storage device, showing its various storage areas and pouches.
FIG. 6 is an opposite side view of the storage device showing a variation in the size of pouches integrated into the storage device structure.
FIG. 7 is a side view of another embodiment of the supplementary organizer and storage device constructed according to the present disclosure.
FIG. 8 is a side perspective view of one of the sides of the storage device shown in FIG. 7.

Referring now to FIG. 5, a front perspective view of the second side 18 is shown. The second side 18 fits over a side 46 of the refrigerator 12 and the second side 18 may be sized and shaped to cover a portion or all of the side 46. The second side 18 has the first row 28 having the three pockets 24, the second row 30 having the three compartments 26, and the third row 32 having the two pockets 24 with one of the pockets 24 being larger than the other pocket 24.

FIG. 6 illustrates a front perspective view of the first side 16 of the supplementary organizer and storage device 10. The first side 16 fits over another side 48 of the refrigerator 12. The first side 16 may be sized and shaped to cover a portion or all of the side 48 of the refrigerator 12. For example, the first side 16 may only cover a portion of the side 48 in order for a door (not shown) associated with the refrigerator 12 to be opened or to not block or interfere with the operation of the door. The first side 16 has the first row 34 having four pockets 20, the second row 38 having the three compartments 22, and the third row 40 having the two equally sized pockets 22.

Figure 13:
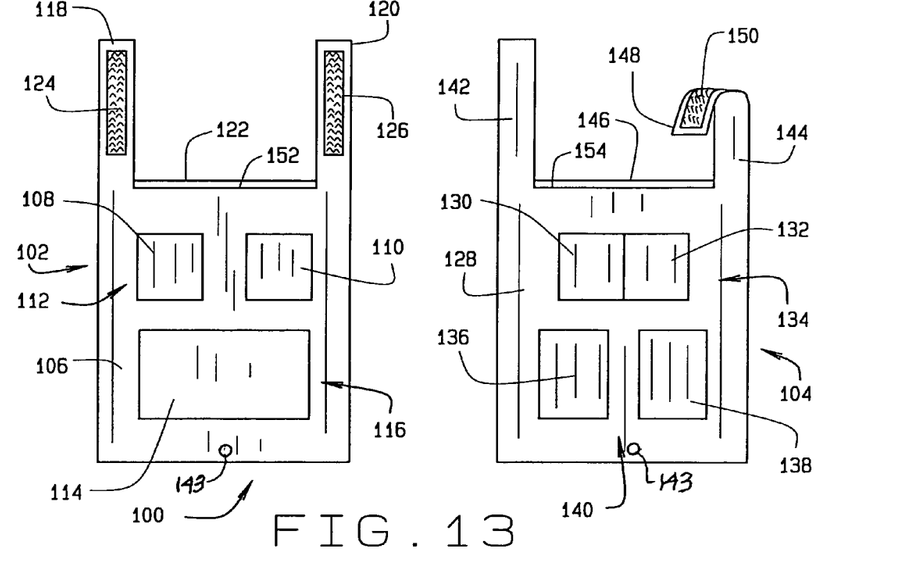
FIG. 13 is a perspective view of another embodiment of a supplementary organizer and storage device constructed according to the present disclosure.
Figure 14:
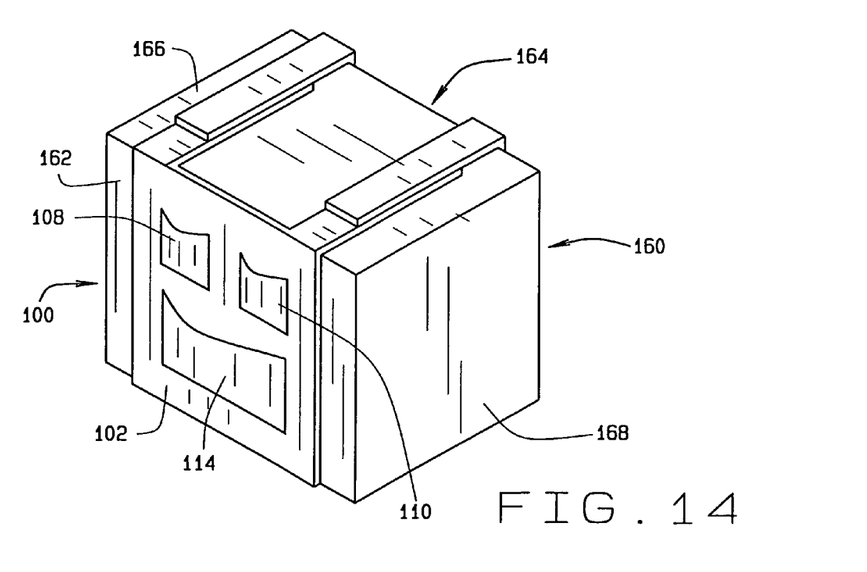
FIG. 14 is a side perspective view of the supplementary organizer and storage device shown in FIG. 13, in this instance being placed upon a mini refrigerator or other item of furniture, and which may also include support rods upon the upper edges of the side panels to prevent excessive draping of said panels in their application upon an appliance or item of furniture.

Although the central portion 14 is shown as having the same width as the first side 16 and the second side 18, it is contemplated that the central portion 14 may be of lesser width in that the central portion 14 is only used to connect the first side 16 to the second side 18 as they drape upon an item of furniture of select width. Although the central portion 14 may appear to have the same dimension as the first side 16 and second side 18, it is contemplated that the central portion 14 may be shorter in length in some cases in that the central portion 14 may be designed to lay on top of an appliance surface that is shorter than the length of the sides of the appliance, on which each side of the organizer hangs. Further, the central portion 14, in an alternative embodiment, may consist of a pair of straps, as seen in FIGS. 13 and 14, which can be connected or fastened together. Most likely, a hook and loop system, like Velcro is used to attach the first side 16 and the second side 18 together. In this manner, the storage device 10 may be adjustable in size so that the storage device 10 can be accommodated onto the mini refrigerator 12, or other household furnishing, to function as the storage device 10. The straps allow the storage device 10 to be expanded laterally, for fitting over to the sides of the mini refrigerator 12 or other accessory upon which the device 10 is installed, or to allow also for an expansion width wise, to extend forwardly, and fit over the entire top of any furnishing upon which the device 10 is installed, when to be used as a storage device as described herein. This defines the accessibility of usage of the storage device 10, how the device 10 can be used upon various types of furnishings, regardless of their size, since the storage device 10 may have built-in adjustability features, to allow the device 10 to be expanded, or contracted, both lateral and width wise, to allow the device 10 accommodation upon the furnishing to which the device 10 is applied. This is just an example of the versatility of the storage device 10.

With particular reference now to FIG. 7, another embodiment of a supplementary organizer and storage device 50 is shown. The storage device 50 is shown being installed over a refrigerator 52, such as a mini refrigerator which may be located in a college dormitory room or apartment. The storage device 50 comprises a central portion 54 having a first side 56 and a second side 58. The first side 56 and the second side 58 may be reversed over the refrigerator 52, if desired. The first side 56 has a number of pockets or pouches 60 for receiving items such as objects, utensils, tools, or accessories. The first side 56 also has a number of elastic mesh storage compartments 62. The second side 58 has a number of pockets or pouches 64 and a number of elastic mesh storage compartments 66. All of the pockets 60 and 64 and the compartments 62 and 66 may be expandable by use of gussets or elastic to accommodate a number of different sized and shapes objects for storage therein.

FIG. 8 illustrates a side perspective view of the second side 58. The second side 58 has a first row 68 of three elastic mesh storage compartments 66. In this particular embodiment there are three equally sized storage compartments 66 in the first row 68. A second row 70 is provided on the second side 58 having a pair of unequal sized pockets 64 with the larger sized pocket 64 capable of storing larger items. Obviously, pocket sizes may vary.

Figures 9, 10, 11, 12:
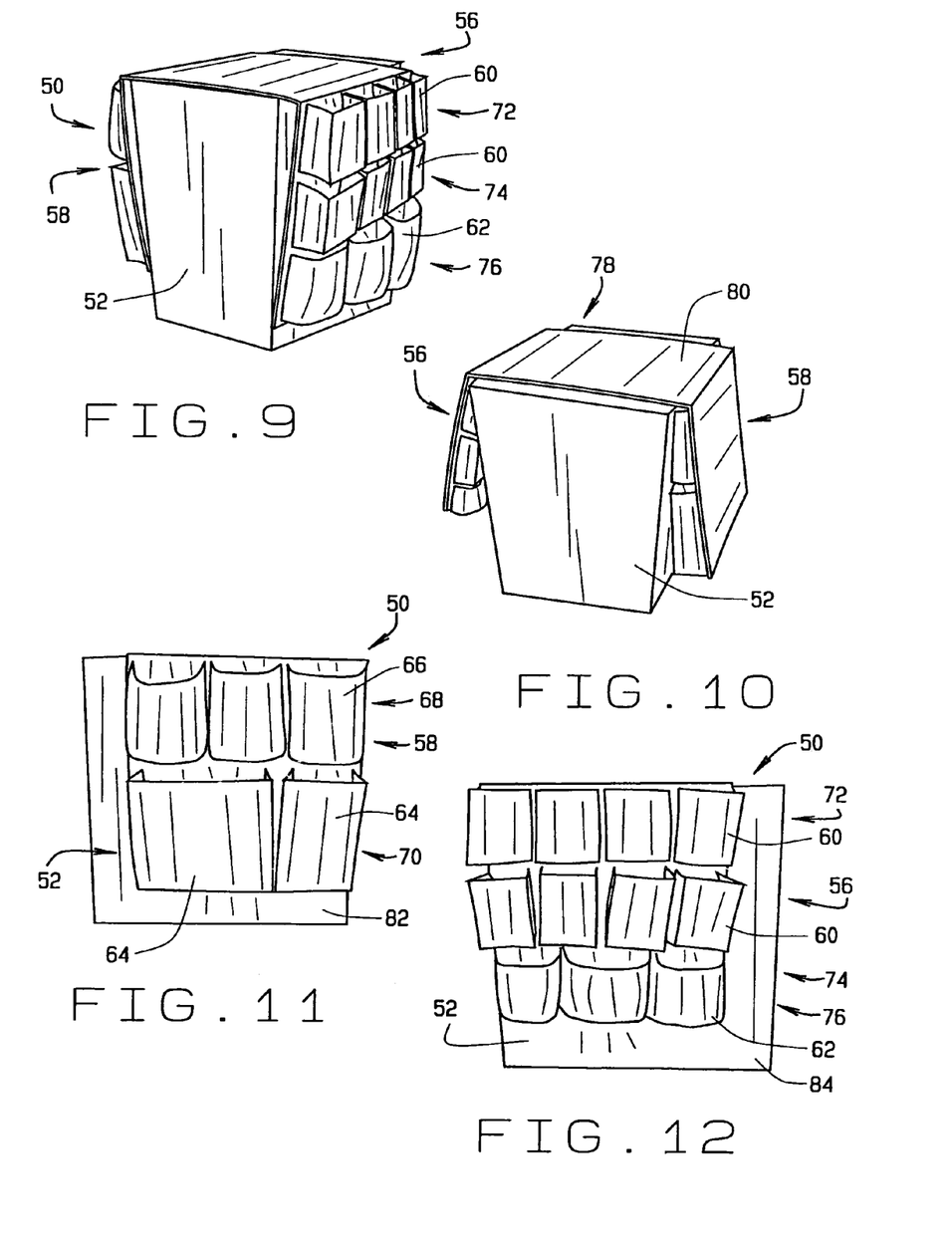
FIG. 9 is an opposite side perspective view of the storage device shown in FIG. 7.
FIG. 10 is an inverted view of the storage device shown in FIG. 7, showing a supplemental liner to provide reinforcement and retention of the storage device when in place for usage in the manner shown in FIG. 7. Moreover, this view is to show the interior surface of the side panels, which hold a padded inner lining for additional protection of surfaces and stored objects.
FIG. 11 is a left side view of the storage device shown in FIG. 7.
FIG. 12 is a right side view of the storage device shown in FIG. 7.

Referring now to FIG. 9, a side perspective view of the first side 56 is shown. The first side 56 has a first row 72 having four equally sized pockets 60. A second row 74 of four equally sized pockets 60 is also provided on the first side 56. A third row 76 has three elastic mesh storage compartments 62. The first side 56 has more pockets 60 in the first row 72 and the second row 74, than the second side 58 has pockets 64. Due to this difference, the first side 56 may be able to store smaller sized items in the pockets 60. Also, the compartments 62 provide more storage for smaller items than the compartments 66 provided in the second side 58.

FIG. 10 depicts the supplementary organizer and storage device 50 being turned inside out or inverted to show an interior side 78 of the central portion 54. The interior side 78 may consist of a sturdy fabric or a frictional rubberized material 80 so that when the interior side 78 rests on the refrigerator 52 it will not slip or move and will remain in place. In the event that more items are placed in the pockets 60 and compartments 62 of the first side 56, the material 80 will prevent the second side 58 from moving. Without the interior side 78 having the material 80, the storage device 50 may slip or shift off of the refrigerator 52 presenting an uneven appearance. This view also shows the interior surface of the side panels, which hold a padded inner lining for additional protection of surfaces that the storage item is placed on and the stored objects the item holds.

Referring now to FIG. 11, a front perspective view of the second side 58 is shown. The second side 58 fits over a side 82 of the refrigerator or furniture 52 and the second side 58 may be sized and shaped to cover a portion or all of the side 82. The second side 58 has the first row 68 having the three compartments 66 and the second row 70 having the two pockets 64 with one of the pockets 64 being larger than the other pocket 64. As can be appreciated with this arrangement larger items may be stored in the larger shown pocket 64.

FIG. 12 shows a front perspective view of the first side 56 of the supplementary organizer and storage device 50. The first side 56 fits over another side 84 of the refrigerator 52. The first side 56 may be sized and shaped to cover a portion or all of the side 84 of the refrigerator 52. For example, the first side 56 may only cover a portion of the side 84 in order for a door (not shown) associated with the refrigerator 52 to be opened or to not block or interfere with the operation of the door. The first side 56 has the first row 72 having the four pockets 60, the second row 74 having the four pockets 60, and the third row 76 having the three compartments 62. The pockets 60 and the compartments 62 provide for numerous items to be stored therein.

Referring in particular now to FIG. 13, another embodiment of a supplementary organizer and storage device 100 is shown. The storage device 100 comprises a first section 102 and a separate second section 104. The first section 102 has a top side 106 having a first pocket 108 and a second pocket 110 in an upper row 112, and a third pocket 114 in a second row 116. The first pocket 108 and the second pocket 110 may be the same size and the third pocket 114 may be larger than the other pockets 108 and 110. The first section 102 also has a first arm portion 118 and a second arm portion 120 extending up from a top edge 122. The first arm portion 118 has a section of hook and loop fastening material 124 placed thereon and the second arm portion 120 also has a section of hook and loop fastening material 126.

The second section 104 has a top side 128 having a first elastic mesh compartment 130 and a second elastic mesh compartment 132 forming an upper row 134. The section 104 also has a first pocket 136 and a second pocket 138 which form a lower row 140. The first compartment 130 and the second compartment 132 may be the same size. The first pocket 136 and the second pocket 138 may also be the same size. The second section 104 also has a first arm portion 142 and a second arm portion 144 extending up from a top edge 146. The second arm portion 144 has a back surface 148 upon which is placed a section of hook and loop fastening material 150. Although not shown in this particular view, the first arm portion 142 also has a section of hook and loop fastening material thereon. As can be appreciated, the hook and loop fastening material 150 is used to secure the upper arm 144 to the hook and loop fastening material 126 of the upper arm 120. Also, the hook and loop fastening material 124 of the upper arm 118 is used to fasten the upper arm 118 to the upper arm 142. In this manner, the storage device may be used to be draped over a refrigerator of any dimension. By use of the upper arms 118, 120, 142, and 144, the storage device 100 may be adjusted. Also, although not shown in this drawing, the back surface 148, and the other back surfaces associated with the other arms 118, 120, and 142, may include a sturdy fabric or a portion of a frictional rubberized material to help prevent movement of the storage device 100. To provide added support and reduce any distortion or draping of the storage device's stop edge, support rods, 152 and 154, made of a sturdy material, may be applied and sewn into the lining along the entire top edge of each side panel. Also, magnets as at 143, may be applied to the bottom edges of each side to hold the storage devices to the appliance.

FIG. 14 illustrates the supplementary organizer and storage device 100 being placed over a mini refrigerator 160. The storage device 100 is draped over the mini refrigerator 160 with the first section 102 being placed over and against a left side 162 of the mini refrigerator 160 and the second section 104 being placed over and against a right side 164 of the mini refrigerator 160, although the second section 104 is not clearly in view in this drawing. (See FIG. 13). The mini refrigerator 160 also has a top 166 upon which are positioned the arms 118 and 120 of the first section 102 and the arms 142 and 144 of the second section 104. As can be appreciated, the arms 118, 120, 142, and 144 are adjustable by use of the portions of hook and loop material 124, 126, and 150. The mini refrigerator 160 has a door 168 that may be opened and when opened the storage device 100 does not interfere with the operation of the door 168. The pockets 108, 110, and 114 are used to store various sized and shaped objects. For example, napkins may be stored in the pocket 108, eating utensils may be stored in the pocket 110, and paper plates may be stored in the pocket 114, as an example.

It should be recognized that the various supplementary organizer and storage devices 10, 50, and 100 of the present disclosure could be constructed of various materials such as fabric, cloth, leather, vinyl, plastic, or other suitable flexible lightweight material. The supplementary organizer and storage devices 10, 50, and 100 may also be constructed of a machine washable fabric that resists food, liquid, moisture, germs, and bacteria. It is also possible that the supplementary organizer and storage devices 10, 50, and 100 may be constructed of a material that is treated with a chemical that repels liquids and microbes. Preferably, the supplementary organizer and storage devices 10, 50, and 100 are formed of relatively lightweight material so that supplementary organizer and storage devices 10, 50, and 100 can be easily manufactured, assembled, transported, stored, and employed for the intended use of the supplementary organizer and storage devices 10, 50, and 100. As can further be appreciated, the supplementary organizer and storage devices 10, 50, and 100 may be constructed in one or more colors or patterns. By way of example only, if the supplementary organizer and storage devices 10, 50, and 100 are to be used in a college dormitory room then the supplementary organizer and storage devices 10, 50, and 100 may included a logo in the colors of the college being attended. As can be appreciated, the supplementary organizer and storage devices 10, 50, and 100 can include various other pockets, pouches, sections, compartments, or elastic mesh storage units as may be desired.

Figure 15:
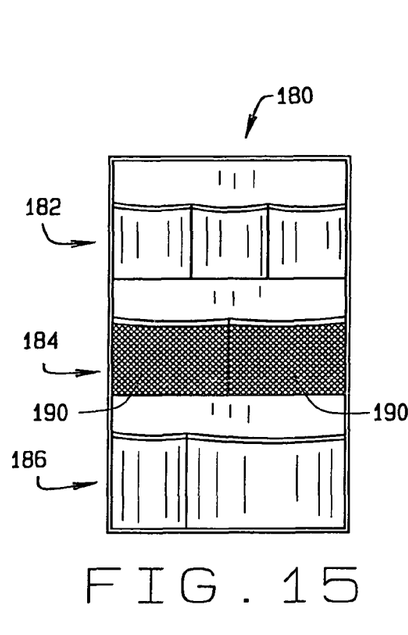
FIG. 15 shows a modified side panel to the storage device wherein the various pockets and pouches are rearranged, and include even one or more mesh pouches for storage.
Figure 16:
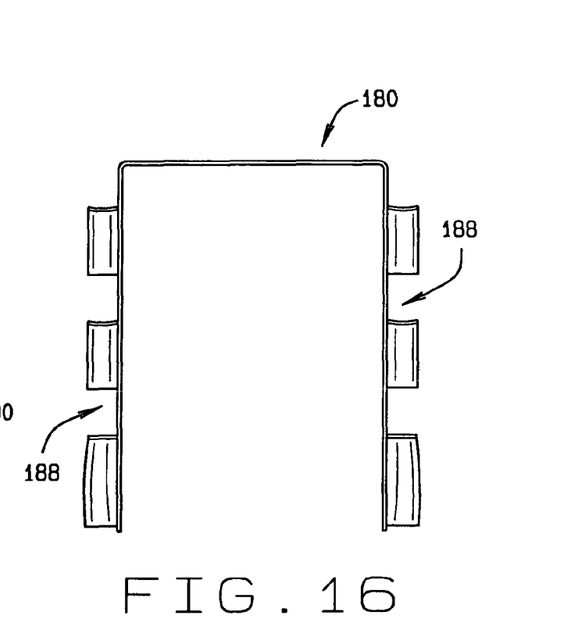
FIG. 16 provides an end view of the storage device, showing the spacing between the various pockets and pouches that add clearance for insertion of items therein.
Figure 17:
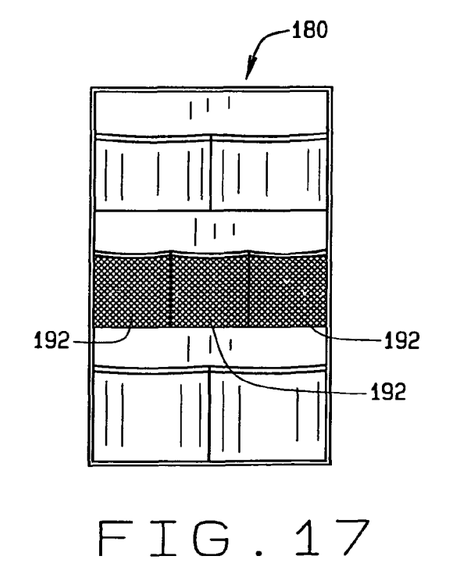
FIG. 17 shows a further rearrangement of the various pockets, wherein, once again, select of the pouches may be formed of mesh material.

FIG. 15 discloses a further pattern of the location of the various pockets to the side panels of the storage device 180, as noted. As can be seen, it includes three rows of pockets, as noted at 182, 184, and 186. As can be seen, as in FIG. 16, there is adequate spacing, as at 188, so that clearance is provided for the insertion of any personal items into the various pouches, as can be understood. As shown, the intermediate row of pockets may be formed of mesh, as noted for the pockets at 190, and there may be, for example, a pair of mesh pockets as noted in FIG. 15, but as can be seen in FIG. 17, the intermediate row of mesh pockets may be formed as three, as noted at 192. In addition, as can further be noted, there may be single pockets, or a plurality of pockets, formed along the various rows for the storage device 180, as can be seen in these FIGS. 15 through FIG. 17.

Figure 18:
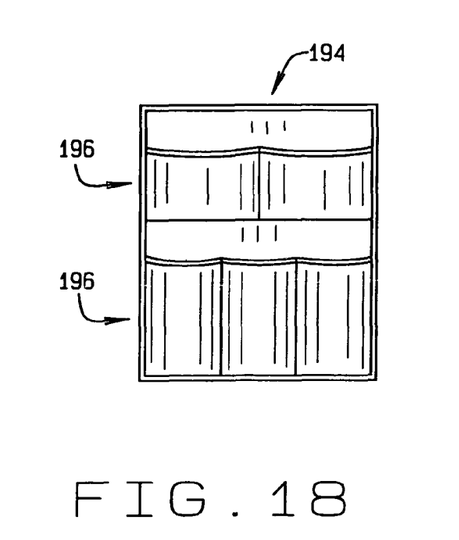
FIG. 18 shows a further rearrangement of the various pockets provided to a side panel of the preferred embodiment of this invention.
Figure 19:
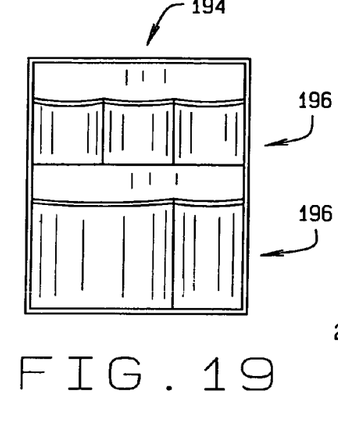
FIG. 19 shows a variation upon the arrangement of the pockets, provided upon a side panel of the storage device.

FIGS. 18 and 19 disclose a storage device 194 and it can be seen that the two rows of pouches or pockets 196 may be of differing sizes and numbers of pockets, as can be noted for the two rows of pouches as shown in these figures for the storage device.

Figure 20:
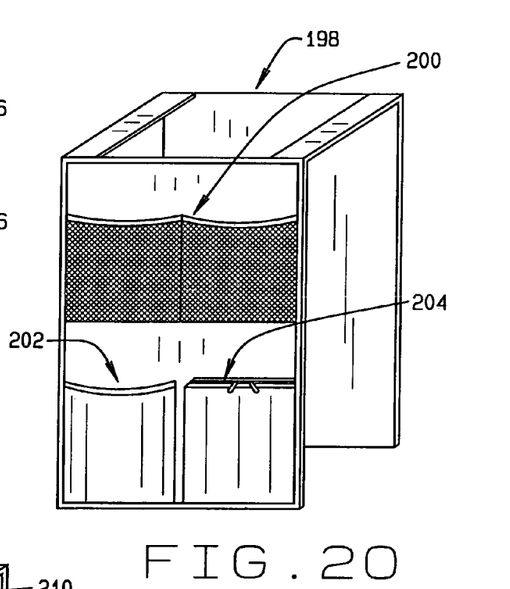
FIG. 20 shows a further variation upon the style of storage device as noted in FIGS. 13 and 14, where select of its pockets may be formed of mesh material, and other pockets may have a zippered closure for security purposes.

FIG. 20 shows a further variation upon the type of storage device as previously explained with respect to FIGS. 13 and 14, but in this particular instance, the storage device 198 may include some mesh pockets, as noted at 200, whereas, in the bottom row, it may include an expandable pouch 202, and a zippered pocket 204 as can be seen. Thus, it may have greater securement, through the application of its zippered pocket, as can be understood.

Figure 21:
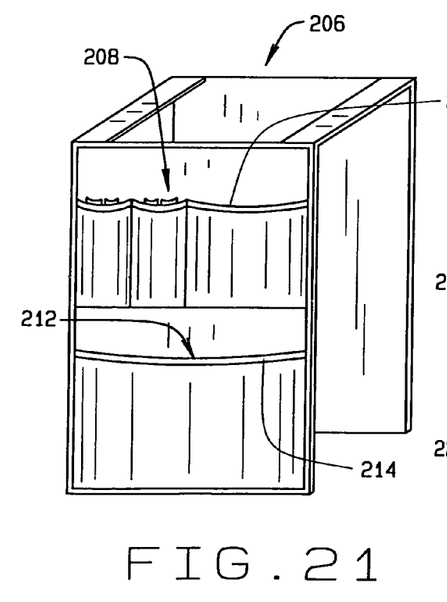
FIG. 21 shows a further variation upon the arrangement of the pockets and pouches for the storage device of FIG. 20.

FIG. 21 shows a further variation upon the storage device 206 where it may include a series of expandable type of pockets 208, and which has an upper margin of elastic, as at 210, to maintain the pocket in a contracted closed condition, until such time as it is pulled open for the deposit or removal of personal items from within the same. Additionally, elastic loops for the organization and storage of utensils, tools, writing instruments, and smaller items may be found and integrated into some pockets. See again in FIG. 21 at 208. Also, as can be seen for the bottom pocket 212, it also has an elastic upper edge, as at 214, which helps to maintain the expandable pocket into closure, as when not in use, or when it contains a personal item, but can be pulled open, for greater access into the pocket during usage.

Figure 22:
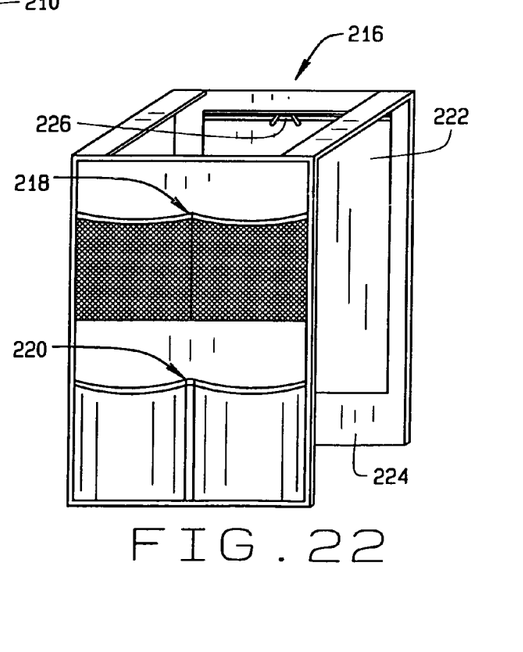
FIG. 22 shows a further variation upon the storage device, disclosing how an optional hidden pocket may be formed interiorly of one of the side panels, and have a zippered or other fastening closure, for security purposes.

FIG. 22 shows a further variation upon the storage device 216, which includes the usual outer pockets, as noted at 218 and 220. But, in this particular instance, there is provided a more hidden and secured type of flat pocket, as at 222, arranged interiorly of the side panel 224, to add a safety feature to the application and usage of the storage device, as can be understood. A zippered or otherwise type of fastener 226 may be provided, to provide closure, and add further securement to the hidden pocket, during usage.

Figure 23:
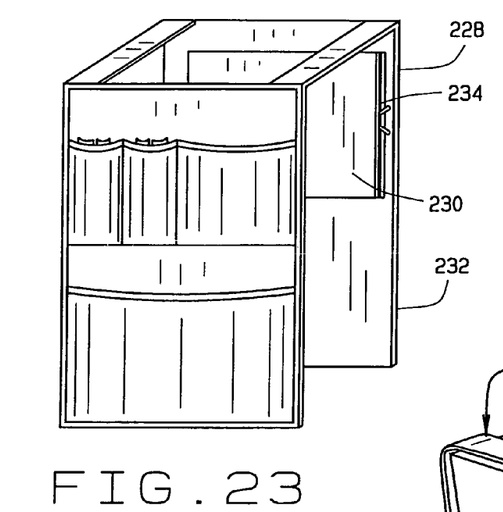
FIG. 23 shows a further variation upon the pouches located upon a side panel, and showing a further optional hidden pocket interiorly of the other side panel and which has side access through a zippered or other fastening means to attain entrance into the storage device.

FIG. 23 shows another storage device 228, having a hidden pocket 230 furnished upon the interior of its side panel 232, and it may have a side closure or fastener 234 as previously explained with respect to the closure 226, to add further security to any items that may be located therein, during storage.

Figure 24:
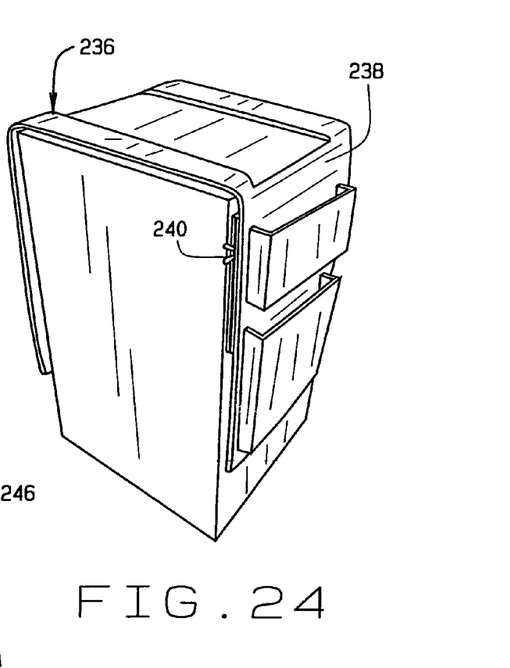
FIG. 24 shows yet another variation upon the storage device of FIG. 23, where a zippered access may be provided along the side edge of at least one of the side panels.

The type of storage device shown in FIG. 24, as at 236, may have a side access to its panel 238, and which also may include a form of fastener, such as a zipper, or hook and pile Velcro fastener, as at 240, along a side edge in order to furnish closure to the device.

Figure 25:
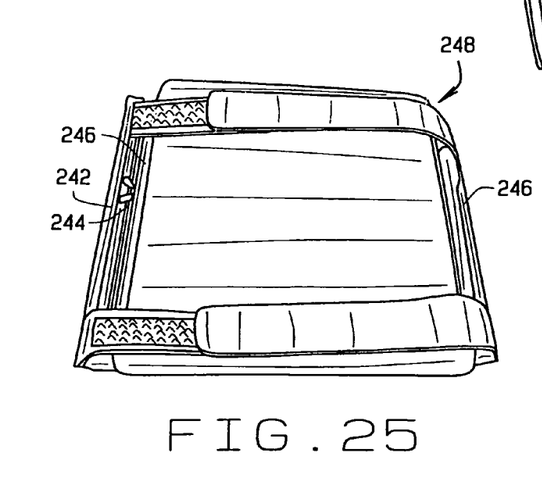
FIG. 25 shows a folded storage device of FIG. 20, and wherein at least one of its side panels may be double layered, and have access through a zippered closure along its upper edge for entrance therein.

Also, as can be seen in FIG. 25, the storage device 242 which is of the type that may or may not include a reinforcing rod along their upper margins of the side panels, as at 244, may further include a zippered or other fastener closure, as at 246, in order to provide for access into the side panels, which in this particular instance, as previously explained, may be formed as a double panel, having both exterior and interior panels, that are secured together, to form an integral pocket within one or both side panels for the shown storage device 248.

These are all examples of the versatility of the storage device of this invention, how various pockets may be rearranged in their application to the side panels, and how the side panels themselves may be formed as integral pockets, both exteriorly and interiorly thereof, in order to add to the storage capabilities of the storage device, in addition to adding to security for any of the personal items that are located therein.

As previously mentioned it is possible and contemplated that the supplementary organizer and storage devices 10, 50, and 100 may include magnets at the bottom edges or along the side edges to secure the devices 10, 50, and 100 to a metal type appliance such as a refrigerator or to shelving.

From all that has been said, it will be clear that there has thus been shown and described herein a supplementary organizer and storage device. It will become apparent to those skilled in the art, however, that many changes, modifications, variations, and other uses and applications of the subject supplementary organizer and storage device are possible and contemplated. All changes, modifications, variations, and other uses and applications which do not depart from the spirit and scope of the disclosure are deemed to be covered by the disclosure, which is limited only by the claims which follow. For example, the interior of the side panels may be padded to protect the furniture upon which the storage device is applied.

I claim:

1. A supplementary organizer and storage device for use upon a mini refrigerator in a dormitory or apartment and useful for temporary storage of accessories, comprising:

said device including a central portion forming a panel to cover substantially an entire upper surface of the mini refrigerator upon which said device is applied, said central portion having an interior upper surface, and said interior upper surface having a portion of frictional material to prevent said central portion from slipping relative to the refrigerator during usage of said device;

said device having a first side and a second side, each said side having an upper edge, and the upper edge of each side securing to opposite side edges of said central portion of said device, and said first side and said second side draping down sides of the refrigerator upon which the device is applied during usage;

a plurality of pockets applied to each of the first side and said second side of the device, and said pockets being arranged in rows upon said sides, and select of said pockets being of differing sizes from each other, and at least one of said pockets having a circular compartment, with said circular compartment being shaped to hold a circular item therein, and at least one of said pockets comprising an elastic mesh compartment for holding items, and at least one of said pockets being expandable and formed of elastic material to provide for expansion to facilitate its opening and storage of items therein;

at least one of said first side and second side is formed of a pair of liners, to form a supplementary interior pocket between said liners, said interior pocket having edges, and a fastening means provided at least along one of the edges of said interior pocket to add closure, and said fastening means comprises a zipper, and is located along an upper edge of said edges of said interior pocket; and wherein said device capable of being applied onto the mini refrigerator, with said central portion placed on top of the refrigerator and resistant to sliding there upon, and with said first side and said second side draping over the refrigerator and arranging in contiguity with the sides of the refrigerator to which the device is applied.

2. The supplemental organizer and storage device of claim 1, and further comprising a magnet provided proximate a bottom edge of each of the sides of said storage device, for adherence of the storage device to any metal surface of the refrigerator upon which the storage device is applied.

3. The supplemental organizer and storage device of claim 1 wherein select ones of the pockets are the same size.

4. The supplemental organizer and storage device of claim 1 wherein said frictional material is a frictional rubberized material.

5. The supplementary organizer and storage device of claim 1 and further comprising an interior surface for the first side and second side being padded with an inner lining to furnish additional protection to the refrigerator to which the device is applied.

6. The supplemental organizer and storage device of claim 1 wherein said first side and second side have a reinforcing rod applied to the upper edge of each of said first and second sides to prevent draping during usage of the said device.

7. The supplementary organizer and storage device of claim 1 wherein at least one of said pockets including a fastening means to secure it into closure.

8. A supplementary organizer and storage device upon a mini refrigerator and useful for temporary storage of accessories therein, comprising:

said device including a central portion formed of pairs of straps and extending across an upper surface of the refrigerator upon which the device is applied, said pair of straps having interior surfaces, and said interior surfaces having a frictional material to prevent the central portion from slipping relative to the refrigerator during usage of said device;

said device having a first side and a second side, each said side having an upper edge, and the upper edge of said side securing to said pair of straps, and said first side and second side draping downwardly along sides of the refrigerator upon which the device is applied during usage;

a plurality of pockets supplied to each of the first side and said second side of the device, and said pockets being arranged in rows upon said sides, and selective said pockets being of differing sizes from each other, and at least one of said pockets forming a circular compartment, with the circular compartment being shaped to hold a circular item therein, and at least one of said pockets comprising an elastic mesh compartment for holding items, and at least another of said pockets being expandable and formed of elastic material to provide for expansion to facilitate its opening and storage of items therein;

at least one of said first side and second side is formed of a pair of liners, to form a supplementary interior pocket between said liners, said interior pocket having edges, and a fastening means provided at least along one of said edges of said interior pocket to add closure, and said fastening means comprising a zipper, and is located along an upper edge of said edges of the interior pocket; and wherein said device capable of being applied onto the upper surface of the refrigerator, with said straps of the central portion placed on top of the refrigerator and with said first side and said second side draping over the refrigerator and arranging in contiguity with the sides of the refrigerator to which the device is applied.

9. The supplemental organizer and storage device of claim 8, wherein said pairs of straps being secured together by means of hook and pile fastening means, and said straps being adjustable to provide for their accommodation upon the top surface of refrigerators of differing sizes.

10. The supplemental organizer and storage device of claim 9 wherein said first side and second side have a reinforcing rod applied to the upper edge of each of said first and second sides to prevent draping of said sides during usage of the device.

11. A supplementary organizer and storage device for use upon a mini refrigerator in a dormitory or apartment and useful for temporary storage of accessories, comprising:

said device including a central portion forming a panel to cover substantially an entire upper surface of the mini refrigerator upon which said device is applied, said central portion having an interior upper surface, and said interior upper surface having a portion of frictional material to prevent said central portion from slipping relative to the refrigerator during usage of said device;

said device having a first side and a second side each said side having an upper edge, and the upper edge of each side securing to opposite side edges of said central portion of said device, and said first side and said second side draping down sides of the refrigerator upon which the device is applied during usage, a plurality of pockets applied to each of the first side and said second side of the device, and said pockets being arranged in rows upon said sides, and select of said pockets being of differing sizes from each other, and at least one of said pockets having a circular compartment, with said circular compartment being shaped to hold a circular item therein, and at least one of said pockets comprising an elastic mesh compartment for holding items, and at least one of said pockets being expandable and formed of elastic material to provide for expansion to facilitate its opening and storage of items therein;

at least one of said first side and second side is formed of a pair of liners, to form a supplementary interior pocket between said liners, said interior pocket having edges, and a fastening means provided at least along one of the edges of said interior pocket to add closure, said fastening means includes a zipper, and locates along at least one of said edges of the interior pocket; and wherein said device capable of being applied onto the mini refrigerator, with said central portion placed on top of the refrigerator and resistant to sliding there upon, and with said first side and said second side draping over the refrigerator and arranging in contiguity with the sides of the refrigerator to which the device is applied.

12. A supplementary organizer and storage device upon a mini refrigerator and useful for temporary storage of accessories therein, comprising:

said device including a central portion formed of pairs of straps and extending across an upper surface of the refrigerator upon which the device is applied, said pair of straps having interior surfaces, and said interior surfaces having a frictional material to prevent the central portion from slipping relative to the refrigerator during usage of said device;

said device having a first side and a second side, each said side having an upper edge, and the upper edge of said sides securing to said pair of straps, and said first side and second side draping downwardly along sides of the refrigerator upon which the device is applied during usage;

a plurality of pockets supplied to each of the first side and said second side of the device, and said pockets being arranged in rows upon said sides, and selective said pockets being of differing sizes from each other, and at least one of said pockets forming a circular compartment, with the circular compartment being shaped to hold a circular item therein, and at least one of said pockets comprising an elastic mesh compartment for holding items, and at least another of said pockets being expandable and formed of elastic material to provide for expansion to facilitate its opening and storage of items therein;

at least one of said first side and second side is formed of a pair of liners, to form a supplementary interior pocket between said liners, said interior pocket having edges, and a fastening means provided at least along one of the edges of said interior pocket to add closure, and said fastening means includes a zipper, and locates along at least one of said edges of the interior pocket; and wherein said device capable of being applied onto the upper surface of the refrigerator, with said straps of the central portion placed on top of the refrigerator and with said first side and said second side draping over the refrigerator and arranging in contiguity with the sides of the refrigerator to which the device is applied.

* * * * *